United States Patent [19]

Nakamura et al.

[11] Patent Number: 4,615,558

[45] Date of Patent: Oct. 7, 1986

[54] INSTALLATION STRUCTURE FOR STRIKER OF DOOR LOCK MECHANISM IN CENTER-PILLARLESS VEHICLE

[75] Inventors: Yoshiharu Nakamura, Atsugi; Ryuji Nishimiya, Hiratsuka, both of Japan

[73] Assignees: Nissan Motor Company, Limited, Yokohama; Nissan Shatai Company, Limited, Hiratsuka, both of Japan

[21] Appl. No.: 805,419

[22] Filed: Dec. 9, 1985

Related U.S. Application Data

[63] Continuation of Ser. No. 513,686, Jul. 14, 1983, abandoned.

[30] Foreign Application Priority Data

Jul. 16, 1982 [JP] Japan .................. 57-124194

[51] Int. Cl.4 .................. B62D 25/00; B60J 5/04
[52] U.S. Cl. .................. 296/203; 296/202; 296/209; 296/301; 296/155; 292/216; 292/DIG. 3; 49/213; 49/143
[58] Field of Search .................. 296/30, 146, 155, 188, 296/202, 203, 209; 49/143, 213, 225; 292/216, 340, DIG. 3

[56] References Cited

U.S. PATENT DOCUMENTS

| | | | |
|---|---|---|---|
| 2,012,057 | 8/1935 | Swallow | 296/209 |
| 2,248,319 | 7/1941 | Waterhouse et al. | 296/203 |
| 2,881,019 | 4/1959 | Leslie et al. | 292/5 |
| 2,918,317 | 12/1959 | Thomas | 292/5 |
| 3,132,891 | 5/1964 | Pyuro | 296/204 |
| 3,591,225 | 7/1971 | Hagemeyer | 292/340 |
| 3,788,686 | 1/1974 | Rossie et al. | 296/146 |
| 4,307,911 | 12/1981 | Pavlik | 296/188 |
| 4,433,507 | 2/1984 | Chikaraishi | 49/213 |

FOREIGN PATENT DOCUMENTS

| | | | |
|---|---|---|---|
| 3026174 | 2/1981 | Fed. Rep. of Germany | 296/202 |
| 2372067 | 7/1978 | France | 296/146 |
| 737655 | 9/1965 | United Kingdom | 296/203 |

OTHER PUBLICATIONS

European Search Report

*Primary Examiner*—Robert B. Reeves
*Assistant Examiner*—Dennis H. Pedder
*Attorney, Agent, or Firm*—Schwartz, Jeffery, Schwaab, Mack, Blumenthal & Evans

[57] ABSTRACT

An automotive vehicle having no pillar between adjacent front swinging and rear sliding doors is provided a structure for mounting a front door striker engageable with a door lock of the front door. The door striker is mounted on a vehicle side sill with a reinforcement which provides sufficient stiffness for the vehicle side sill for resisting against bending stress applied thereto. A guide rail retainer secured to an inner wall of the side sill supports an end of a guide rail for the sliding rear door.

12 Claims, 8 Drawing Figures

INSTALLATION STRUCTURE FOR STRIKER OF DOOR LOCK MECHANISM IN CENTER-PILLARLESS VEHICLE

This application is a continuation of application Ser. No. 513,686 filed July 14, 1983 now abandoned.

BACKGROUND OF THE INVENTION

The present invention relates generally to a door lock mechanism in an automotive vehicle with a center-pillarless body. More particularly, the invention relates to a structure for installing a striker in a swing door lock mechanism of the automotive vehicle.

Generally, a door lock mechanism is provided in a vehicle door. The lock mechanism is engageable with a striker secured in a center-pillar which extends in essentially vertical direction and divides a door opening into a front door opening and a rear door opening in a vehicle having front and rear doors. If the center-pillar can be taken out, a wider opening for getting in and out can be provided for the convenience of passengers. On the other hand, by taking out the center-pillar, difficulty is encountered in providing a door lock mechanism because the striker cannot be installed at its usual position on the center pillar.

A center-pillarless vehicle body construction can be provided with a door lock mechanism adjacent the upper and/or lower edges of the door. In this case, the strikers are secured onto a part of the vehicle framework such as the roof side frame or the side sill. Such vehicle body construction requires reinforcement of the vehicle framework to provide sufficient strength for the vehicle framework against bending stresses which may arise when the door is opened or closed.

SUMMARY OF THE INVENTION

Therefore, it is an object of the present invention to provide a door lock mechanism which is suitable for a center-pillarless vehicle.

Another object of the present invention is to provide a structure for installing a striker of a door lock mechanism in a center-pillarless vehicle.

To accomplish the foregoing and other objects, an installation structure for a striker of a door lock mechanism includes a striker adapted for installation on a vehicle framework. The vehicle framework is reinforced by a reinforcement construction including a portion to which the striker is secured. The reinforcement construction is designed to not only reinforce the portion of the framework on which the striker is secured, but also the vehicle framework itself for increasing the ability of the framework to resist bending stress.

According to the present invention, an installation structure for a striker of a door lock mechanism for a center-pillarless vehicle comprises a vehicle body side frame extending substantially along a lateral side of the vehicle body, the side frame having a hollow cross-section with an internal space therein, a door lock striker fixedly mounted on the outer surface of the side frame, a reinforcement member disposed within the internal space of the side frame and having a laterally extending section mating to a portion of the outer surface on which the door lock striker is mounted and secured thereto, whereby the side frame is reinforced by the reinforcement member for resisting against a bending moment applied thereto when the door lock striker engages a door lock mechanism of a vehicle door.

In another aspect, a door lock mechanism for a swing door of a center-pillarless automotive vehicle comprises a vehicle body having a door opening, a swing door hinged at an edge of the door opening and having a door lock, vehicle body side frame extending substantially along the vehicle body lateral side, a door lock striker secured onto the side frame in opposing relationship to the door lock of the swing door, and a reinforcement member disposed within the frame and extending along the internal space defined in the side frame, the reinforcement member having a lateral extension for reinforcement of the side frame at a portion on which the door striker is mounted.

BRIEF DESCRIPTION OF THE DRAWINGS

The present invention will be understood more fully from the following detailed description and from the accompanying drawings of a preferred embodiment of the invention, which, however, should not be taken as limiting the invention but are for illustration and explanation only.

In the drawings.

DESCRIPTION OF THE PREFERRED EMBODIMENTS

Figure 1:
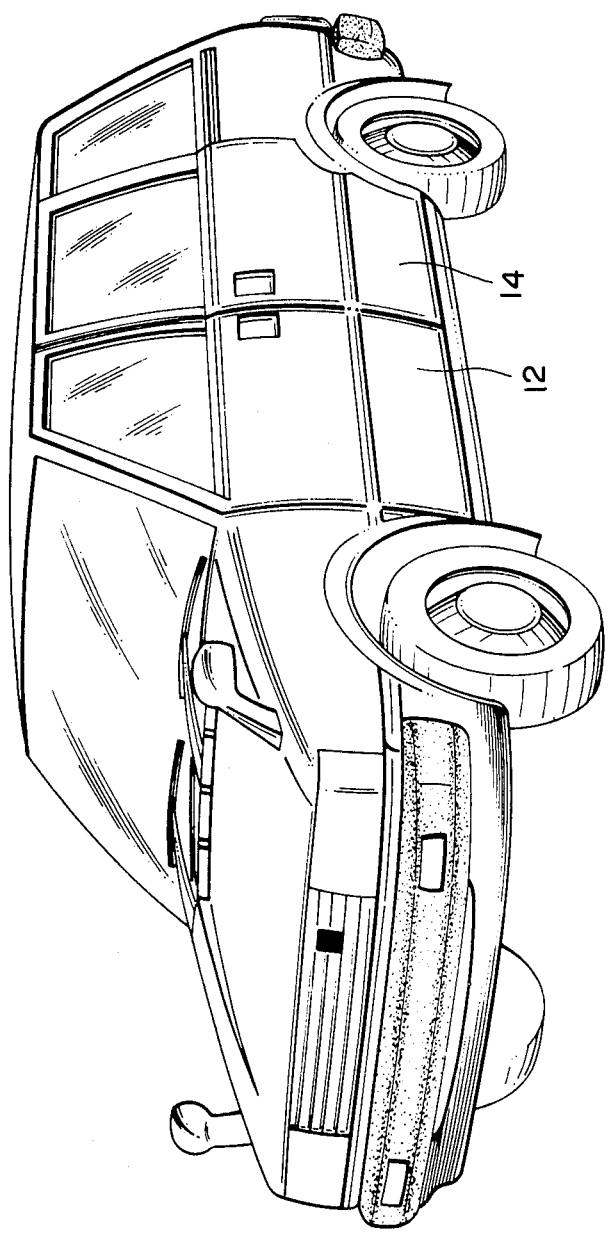
FIG. 1 is a fragmentary perspective illustration of an automotive vehicle having a center-pillarless body construction with single door opening at each side, in which are installed a front swing door and rear sliding door, the front swing door including a preferred embodiment of a door lock mechanism according to the present invention.
Figure 2:
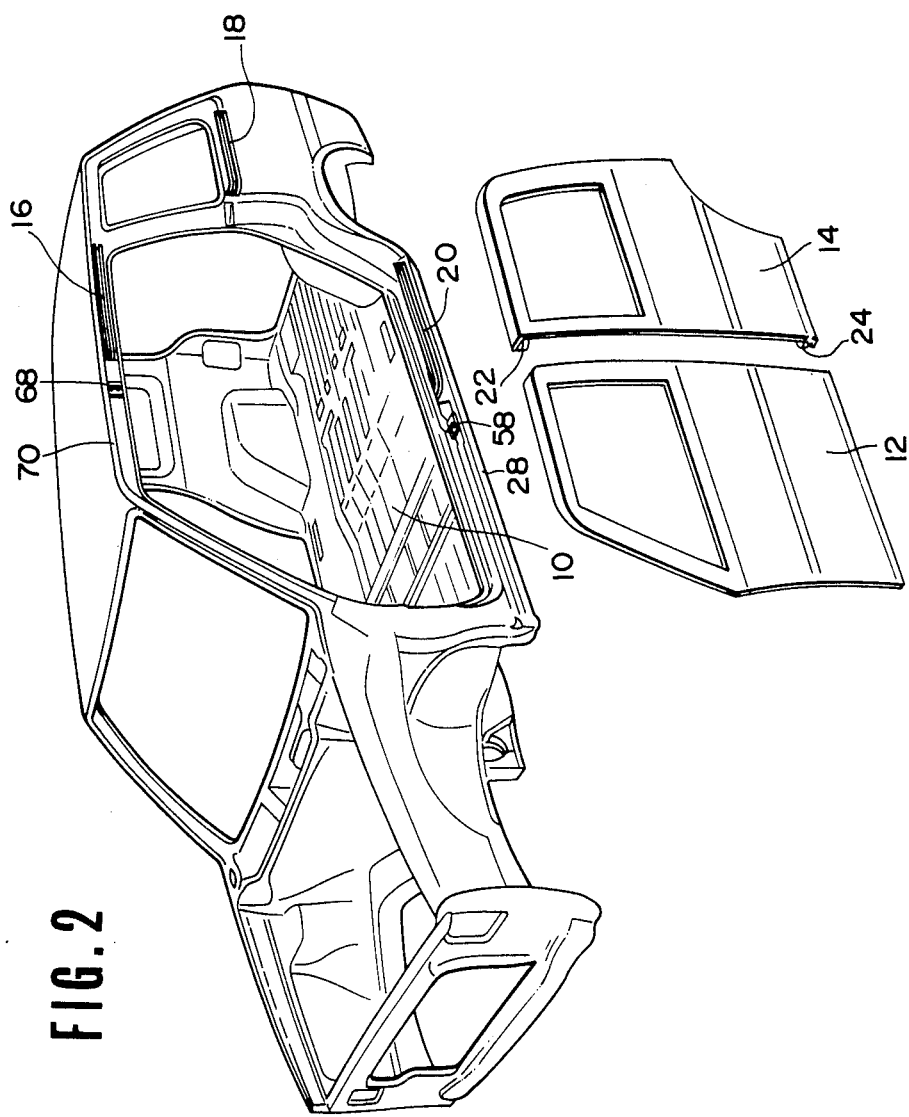
FIG. 2 is an exploded perspective illustration of the vehicle of FIG. 1, in which the front swing door and the rear sliding door are removed from the door opening.
Figure 4:
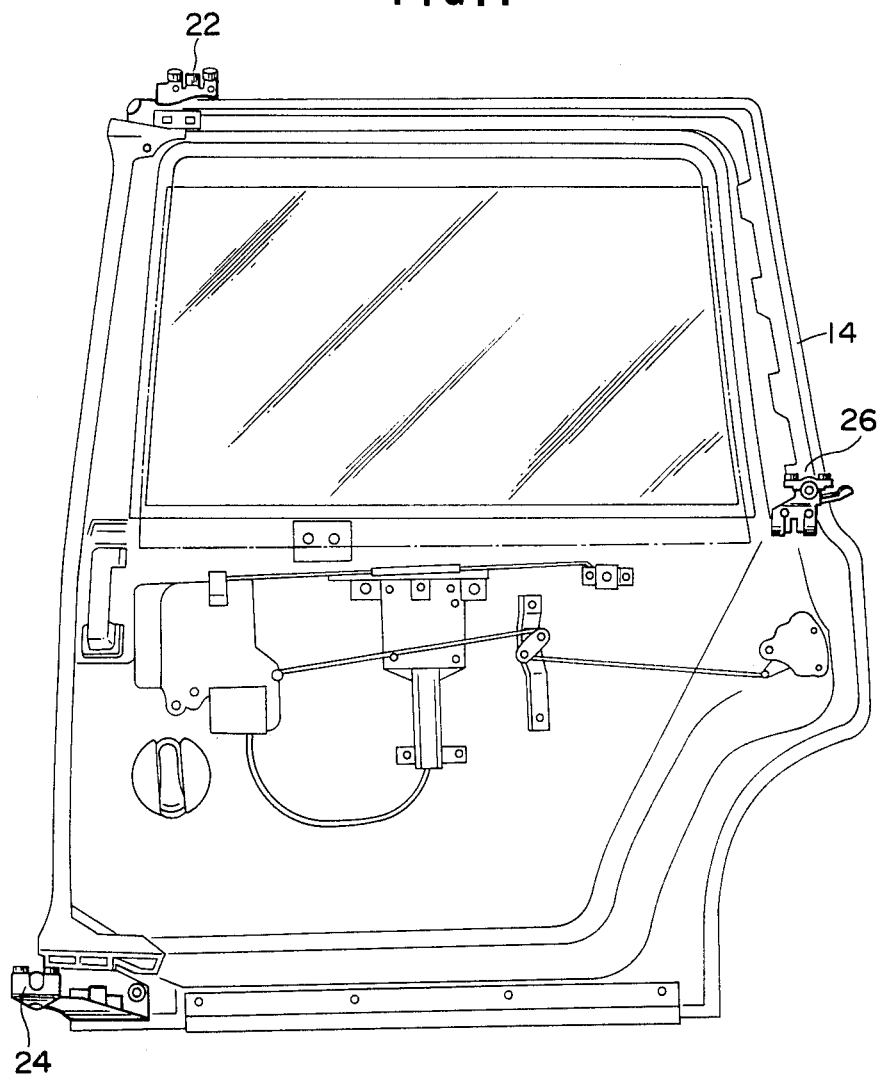
FIG. 4 is a fragmentary elevational view of a rear sliding door for the vehicle of FIG. 1.

Referring now to the drawings, particularly to FIGS. 1 and 2, an automotive vehicle of the center-pillarless type is illustrated with a front swing door 12 and a rear sliding door 14. A single door opening 10 is formed on each side of the vehicle body. The front edge of swing door 12 is pivotally mounted on the front, essentially vertical edge of the door opening 10 in a per se well known manner for opening and closing approximately half of the door opening by swinging movement about a pivot. The rear sliding door 14 slidingly opens and closes the rear half of the door opening 10 and is suspended on an upper guide rail 16, a waist guide rail 18 and a lower guide rail 20. The sliding door 14 is provided with upper rollers 22 adjacent the upper front corner and a lower roller 24 adjacent the lower front corner, and a waist roller 26 adjacent the rear edge thereof, as shown in FIG. 4.

Figure 5:
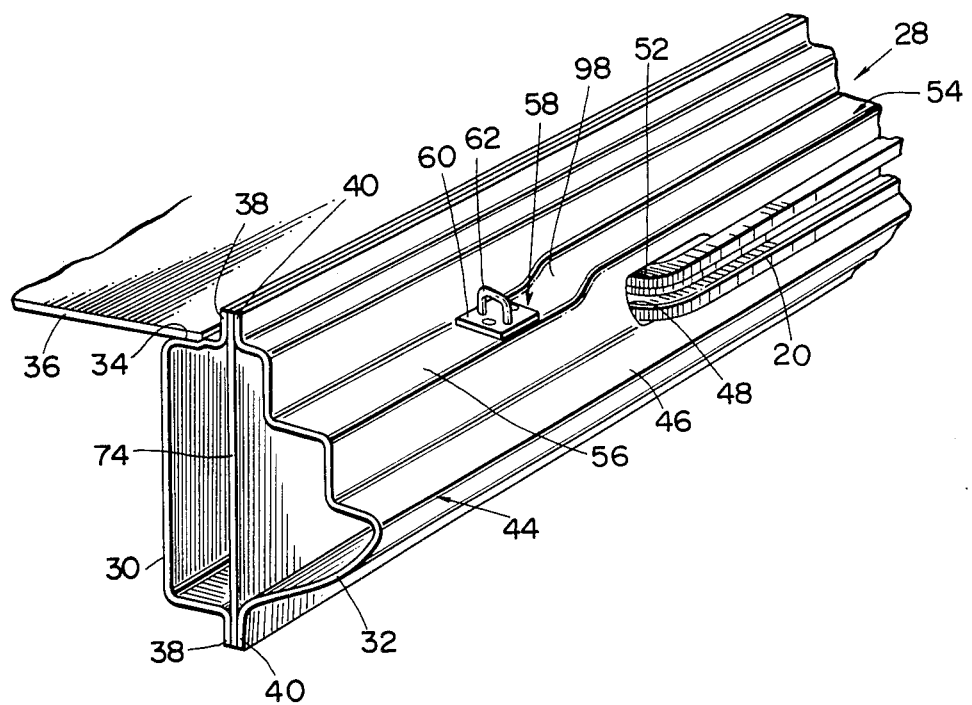
FIG. 5 is an enlarged perspective view of a side sill of a vehicle framework on which a preferred embodiment of a striker installation structure according to the present invention is installed.

The lower guide rail 20 extends along a side sill 28. As shown in FIG. 5, the side sill 28 comprises a sill inner member 30 and a sill outer member 32. The sill inner member 30 is formed into an essentially C-shaped configuration. A lateral edge of a floor panel 36 is fixedly mounted on the substantially horizontal section 34 of the sill inner member 30. The sill inner member 30 has upper and lower flanges 38 which mate with upper and lower flanges 40 of the sill outer member 32. Flanges 38 and 40 may be secured to each other by spotwelding or any other suitable technique and define a closed cross-section for the side sill 28.

Figure 3:
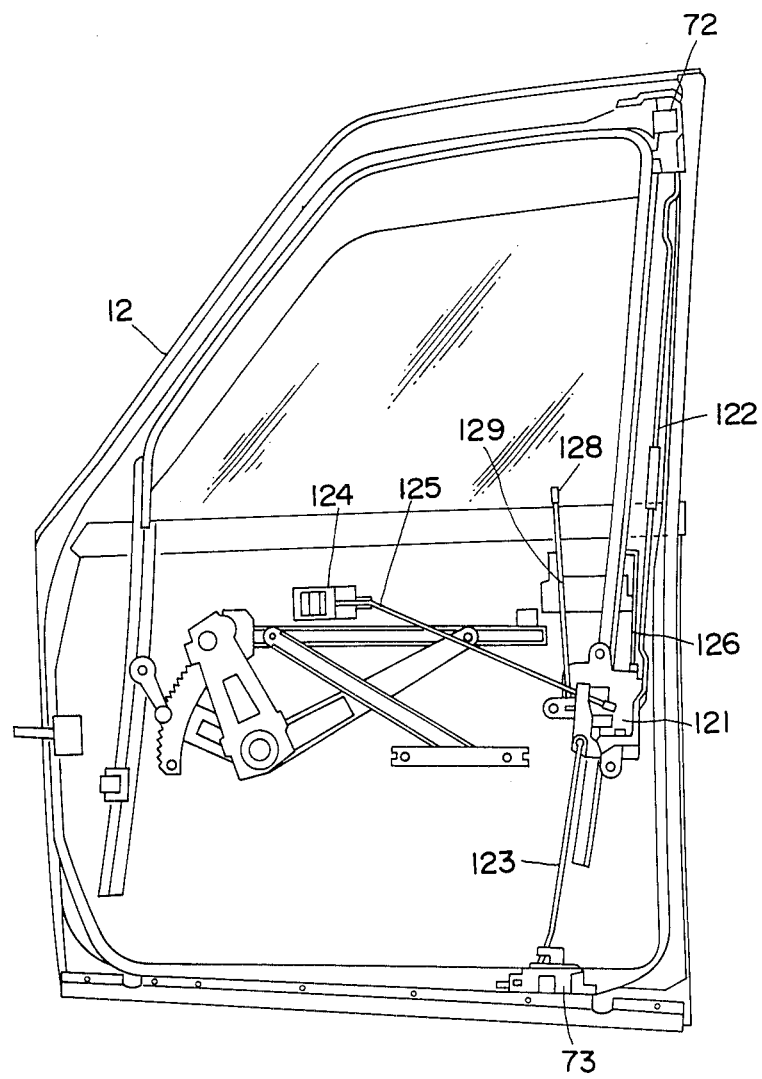
FIG. 3 is a fragmentary and enlarged rear elevation of the front swing door of FIG. 1.

As shown in FIGS. 2 and 3, an upper striker 68 is installed on a roof side frame 70, and a lower striker 58 is installed on the side sill 28. The upper and lower door locks 72 and 73 are provided on the front swing door 12.

Upper door lock 72 is disposed in the upper rear corner of the front swing door 12 so as to be engageable with the upper striker 68 rigidly mounted on the roof side frame of the vehicle. The lower door lock 73 is disposed in the lower portion of the door 12 adjacent the rear corner. Lower door lock 73 is engageable with the lower striker 58, rigidly mounted on the side sill of the vehicle.

Front swing door 12 is further provided with a central lock operating assembly 121. This assembly is operatively connected with the upper door lock 72 via a rod 122 and with the lower door lock 73 via a rod 123.

An interior door handle 124 is located in a suitable location on the inner surface of the door 12, while an outside door handle (not shown) is suitably positioned on the exterior thereof. The assembly 121 is interconnected with the inside handle 124 by means of a rod 125 and with the outside handle by means of a rod 126. When either the inside handle 124 or the outside handle is manipulated to open the front swing door 14, the operating assembly 121 releases the upper door lock 72 and lower door lock 73 simultaneously from the upper striker 68 and lower striker 58, respectively.

A key operable lock cylinder (not shown) is located in a suitable position within the front swing door, while a locking/unlocking knob 128 is provided protruding from a location at the base of the door window. The operating assembly 121 is operatively connected with the lock cylinder and with the knob 128 via a rod 129. When the lock cylinder or the knob 128 is operated to lock the door 12, the operative connection between the inside and outside handles and the upper and lower door locks is cancelled.

As shown in FIG. 5, the sill outer member 32 is formed to have a step 44 with a horizontal surface 46 on which the lower guide rail 20 is fixedly mounted. The lower guide rail 20 is of substantially channel shaped configuration for engagement with the lower roller 24 of the sliding door. The sill outer member 32 is formed with an elongated opening 48. The portion of lower guide rail 20 adjacent the elongated opening is bent towards the elongated opening. The end portion 52 of lower guide rail 20 is thus inserted into the internal space of the side sill 28 through the elongated opening 48.

Figure 6:
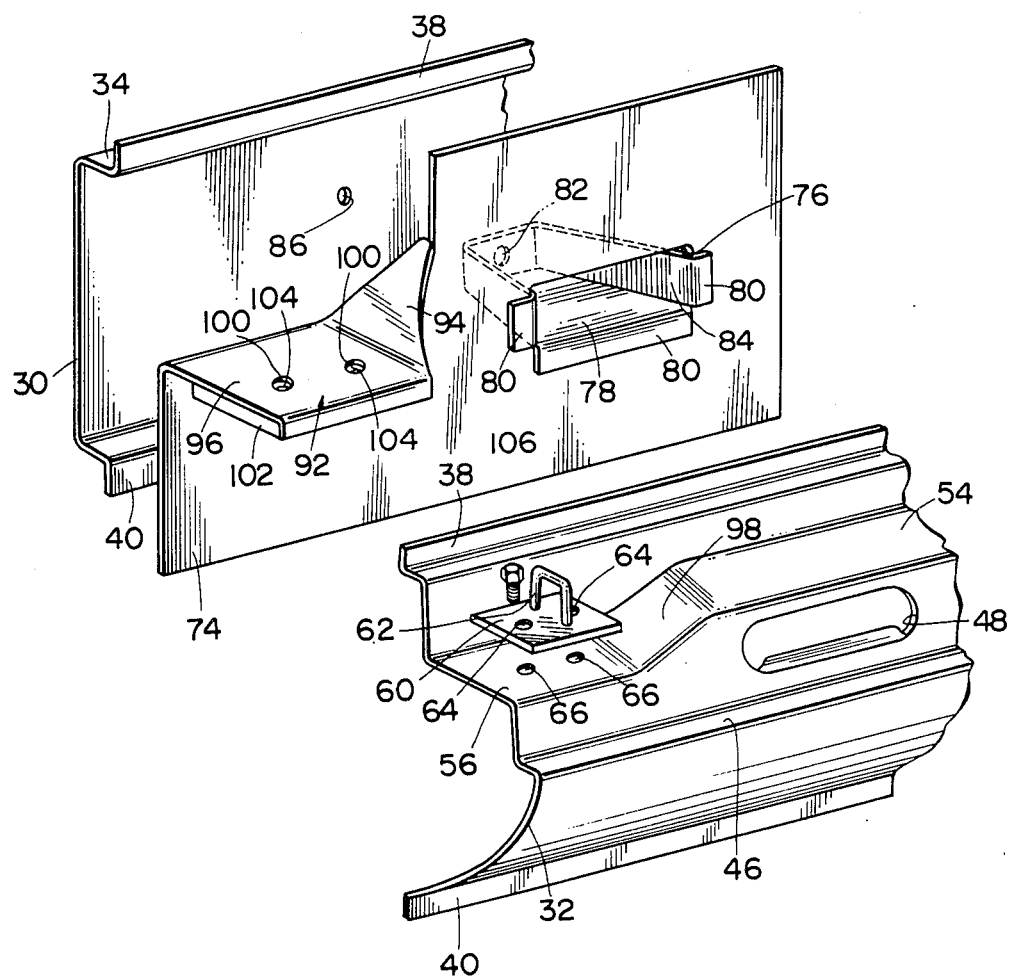
FIG. 6 is a further enlarged exploded perspective view of the side sill with the striker installation structure of FIG. 4.

Sill outer member 32 is also formed with another step 54 at a higher elevation than that of the step 44, the steps extending in essentially parallel relationship with respect to each other. Step 54 includes a downwardly recessed portion 56 on which a door lock striker 58 is fixedly installed. Striker 58 is located at a position corresponding to lower door lock 73 on the front swing door 12, as shown in FIG. 3. Striker 58 has a base member 60 and an angle-shaped striker member 62 vertically extending from the base member. As shown in FIG. 6, the base member 60 is formed with openings 64. The downwardly recessed portion 56 of the sill outer member 32 is also formed with openings 66 at locations corresponding to the openings 64 in the base 60 of the striker 58 for alignment therewith as the striker is installed.

Figure 7:
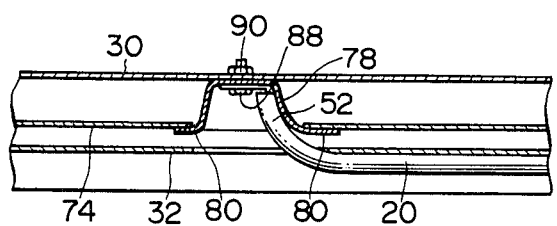
FIG. 7 is a section taken along a horizontal plane extending through line VI—VI of FIG. 4.

As shown in FIGS. 5 and 6, an essentially vertical reinforcement member 74 is inserted in the internal space of the side sill 28. The lower peripheral edge of the vertical reinforcement member 74 is sandwiched between the lower flanges 38 and 40 of the sill inner and sill outer members 30 and 32. The upper peripheral edge of the vertical reinforcement member 74 is also sandwiched between the upper flanges 38 and 40 of the sill inner and outer members 30 and 32. Reinforcement member 74 is formed with an elongated opening 76 at a position corresponding to the elongated opening 48 in sill outer member 32. A guide rail rest 78 for supporting one end of the guide rail 20 passes through opening 76 until attaching flanges 80 contact the reinforcing member 74. Guide rail rest 78 is formed with an opening 82 on the vertical wall portion 84 facing the inner surface of the sill inner member 30. Sill inner member 30 is also formed with an opening 86 aligned with opening 82. A bolt 88 is inserted through the aligned openings 82 and 86, and fastened with a nut 90 to secure the guide rail rest 78 to the sill inner member 30, as shown in FIG. 7.

Figure 8:
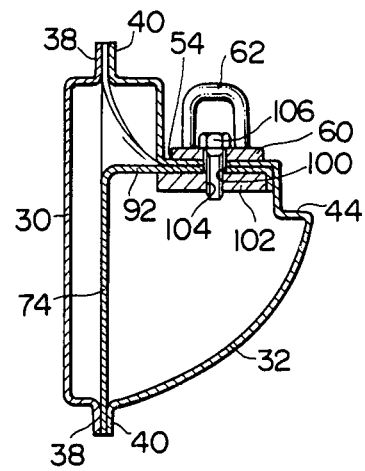
FIG. 8 is a cross-section taken along a vertical plane extending through line VII—VII of FIG. 5.

As particularly shown in FIG. 6, the vertical reinforcement member 74 has a laterally bent portion 92 with a sloped portion 94 and an essentially horizontal portion 96. The slope angle of the sloped portion 94 matches that of the sloped portion 98 between the major part of step 54 and the downwardly recessed portion 56. Therefore, the upper surface of sloped portion 94 mates with the lower surface of the sloped portion 98 of step 54. The upper surface of horizontal portion 96 is adapted to mate with the lower surface of the downwardly recessed portion 56 and is formed with openings 100. A tapping plate 102 with openings 104 is attached to the lower surface of horizontal portion 96. As shown in FIG. 8, respectively corresponding openings 100 and 104 are aligned with the openings 61 and 66. A tapping screw 106 is threaded through each of the aligned holes to secure the base 60 of striker 58, the horizontal portion 96 of vertical reinforcement member 74 and the tapping plate 102 to step 54 of sill outer member 32.

In the illustrated embodiment, the portion of the side sill on which the striker is mounted is sufficiently reinforced by the horizontal portion of the reinforcement member and the tapping plate attached thereto to receive and lockingly engage the locking mechanism 121 of the front swing door 12. Further, the integral reinforcement member 74 used to reinforce the guide rail end receiving portion and the striker installing portion also serves to reinforce the side sill against longitudinal bending stress. This is advantageous to compensate for the lower strength of the vehicle body due to the omission of the center-pillar.

While the present invention has been described with reference to a specific preferred embodiment, modifications of the described embodiment may occur to persons skilled in the art. Therefore, the invention should be understood to include all embodiments or modifications within the scope of the appended claims and equivalents.

What is claimed is:

1. An installation structure for a striker of a door lock mechanism of an automotive vehicle comprising:
   a vehicle body with a center-pillarless construction and having a side opening adapted to be closed by a swing door and a sliding door, said vehicle body including a vehicle body side sill horizontally extending along a lateral side of the vehicle body, said side sill including inner and outer sill members and having a hollow cross-section with an internal space therein and a transversely extending horizontal plane;
   a door lock striker for said swing door fixedly mounted on said horizontal plane of said side sill;
   a reinforcement member disposed within said internal space of said side sill and having a transversely and horizontally extending section mating to said horizontal plane of said side sill at a portion on which said door lock striker is fixedly mounted;
   a guide rail mounted on said side sill and guidingly supporting said sliding door for movement of the latter between a door closing position and a door opening position; and
   a guide rail retainer disposed within the internal space of said side sill for retaining one end of said guide rail, said guide rail retainer including a flanged guide rail rest passing through an opening in said reinforcement member and a means for attaching said guide rail rest to said inner sill.

2. The structure as set forth in claim 1, which further comprises a plate member attached to said transversely and horizontally extending section of said reinforcement member for further reinforcing the striker mounting portion of said side sill.

3. The structure as set forth in claim 1, wherein said transversely and horizontally extending section of said reinforcement member and said door lock striker are secured to said portion with a common fastener.

4. The structure as set forth in claim 2, wherein said transversely and horizontally extending section of said reinforcement member, said door lock striker and said plate member are secured to said portion with a common fastener.

5. An installation structure for a striker of a door lock mechanism of an automotive vehicle comprising:
   a vehicle body with a center-pillarless construction and having a side opening adapted to be closed by a swing door and a sliding door, said vehicle body including a side sill extending substantially along a lateral lower side of said vehicle body, said side sill having a hollow cross-section comprising inner and outer members, and said outer member having a stepped horizontal section extending therealong;
   a door lock striker for said swing door fixedly mounted on said horizontal section of said sill outer member;
   a reinforcement member disposed within the internal space of said side sill, said reinforcement member having upper and lower ends sandwiched between said sill inner and outer members and said reinforcement member having a laterally extending section mating to said horizontal section of said side sill at a portion on which said door lock striker is fixedly mounted;
   a guide rail mounted on said side sill and guidingly supporting said sliding door for movement of the latter between a door closing position and a door opening position; and
   a guide rail retainer disposed within the internal space of said side sill for retaining one end of said guide rail, said guide rail retainer including a flanged guide rail rest passing through an opening in said reinforcement member and a means for attaching said guide rail rest to said inner sill.

6. The structure as set forth in claim 5, which further comprises a plate member attached to said laterally extending section of said reinforcement member for further reinforcing the striker mounting portion of said horizontal section of said side sill.

7. The structure as set forth in claim 5, wherein said laterally extending section of said reinforcement member and said door lock striker are secured to said horizontal section with a common fastener.

8. The structure as set forth in claim 6, wherein said laterally extending section of said reinforcement member, said door lock striker and said plate member are secured to said horizontal section with a common fastener.

9. A side sill structure for a center-pillarless automotive vehicle including a vehicle body having a door opening for a swing door and a sliding door, said swing door having a door lock and hinged at an edge of said door opening, the structure comprising:
   a reinforcement member disposed within said sill and extending along an internal space defined by inner and outer sill members of said side sill, said reinforcement member having a transversely and horizontally extending extension for reinforcement of said side sill;
   a door lock striker secured onto said side sill in opposing relationship to said door lock of said swing door;
   a guide rail mounted on said side sill and guidingly supporting said sliding door for movement of the latter between a door closing position and a door opening position; and
   a guide rail retainer disposed within the internal space of said side sill for retaining one end of said guide rail, said guide rail retainer including a flanged guide rail rest passing through an opening in said reinforcement member and a means for attaching said guide rail rest to said inner sill.

10. The structure as set forth in claim 9, wherein said side sill mounts on an outer surface thereof said door striker and said extension is secured to said side sill at the portion corresponding to the portion of said side sill on which said door striker is mounted.

11. The structure as set forth in claim 10, which further comprises a reinforcement plate attached to said extension.

12. The structure as set forth in claim 11, wherein said extension, said door striker and said reinforcement plate are secured to said side sill with a common fastener.

* * * * *